United States Patent
Chen

(10) Patent No.: US 7,231,442 B2
(45) Date of Patent: Jun. 12, 2007

(54) GLOBAL NETWORK MONITORING SYSTEM

(75) Inventor: John Bradley Chen, Seattle, WA (US)

(73) Assignee: Tonic Software, Inc., Lindon, UT (US)

( * ) Notice: Subject to any disclaimer, the term of this patent is extended or adjusted under 35 U.S.C. 154(b) by 873 days.

(21) Appl. No.: 10/392,196

(22) Filed: Mar. 18, 2003

(65) Prior Publication Data

US 2003/0191837 A1    Oct. 9, 2003

Related U.S. Application Data

(60) Provisional application No. 60/370,048, filed on Apr. 3, 2002.

(51) Int. Cl.
*G06F 15/173* (2006.01)

(52) U.S. Cl. .................................. 709/224

(58) Field of Classification Search ............... 709/224, 709/210, 201; 717/120, 127
See application file for complete search history.

(56) References Cited

U.S. PATENT DOCUMENTS

| | | | | |
|---|---|---|---|---|
| 5,212,788 A | | 5/1993 | Lomet et al. ............... | 395/600 |
| 5,958,010 A | * | 9/1999 | Agarwal et al. ............ | 709/224 |
| 6,006,260 A | | 12/1999 | Barrick, Jr. et al. ........ | 709/224 |
| 6,247,050 B1 | | 6/2001 | Tso et al. ................... | 709/224 |
| 6,701,363 B1 | * | 3/2004 | Chiu et al. .................. | 709/224 |
| 6,714,976 B1 | * | 3/2004 | Wilson et al. ............... | 709/224 |
| 6,721,941 B1 | * | 4/2004 | Morshed et al. ............ | 717/127 |
| 6,760,903 B1 | * | 7/2004 | Morshed et al. ............ | 717/130 |
| 6,782,527 B1 | * | 8/2004 | Kouznetsov et al. ........ | 717/103 |
| 6,801,940 B1 | * | 10/2004 | Moran et al. ................ | 709/224 |
| 6,931,017 B2 | * | 8/2005 | McGowan .................. | 370/401 |
| 7,051,098 B2 | * | 5/2006 | Masters et al. ............. | 709/224 |
| 7,096,248 B2 | * | 8/2006 | Masters et al. ............. | 709/201 |
| 2001/0010059 A1 | * | 7/2001 | Burman et al. ............. | 709/224 |
| 2002/0099818 A1 | * | 7/2002 | Russell et al. .............. | 709/224 |
| 2002/0154641 A1 | * | 10/2002 | McGowan .................. | 370/401 |
| 2006/0129940 A1 | * | 6/2006 | Rajarajan et al. ........... | 715/738 |

* cited by examiner

*Primary Examiner*—Abdullahi Salad
(74) *Attorney, Agent, or Firm*—AdvantEdge Law Group, LLC

(57) ABSTRACT

A method of analyzing performance data collected in regard to a plurality of content sources on a network. A ratio of performance metrics such as a render time for retrieving and displaying images and a fetch time for retrieving a base document, or a render bandwidth and a fetch bandwidth, for different content sources, is very useful in analyzing the performance of a distributed application across the network. By comparing measurements for two or more content sources and analyzing them according to a network structure, it is possible to recognize differences in the relative performance of the content sources and to quantify one content source relative to a standard defined by the performance of the other. The analysis both determines network performance and identifies specific performance problems manifest at specific localities of the network topology.

49 Claims, 5 Drawing Sheets

GLOBAL NETWORK MONITORING SYSTEM

RELATED APPLICATIONS

This application is based on a prior copending provisional application Ser. No. 60/370,048, filed on Apr. 3, 2002, the benefit of the filing date of which is hereby claimed under 35 U.S.C. § 119(e).

FIELD OF THE INVENTION

The present invention generally relates to the online monitoring of the performance of a distributed application across a distributed network of computing systems, and more particularly, to measuring the performance of distributed applications across a global network, or a global network service, from the edge of the network, and at a plurality of small, topologically related blocks of end points.

BACKGROUND OF THE INVENTION

A distributed application is a software system that runs on two or more computers connected by a computer network. Client-server computing is a special case of distributed application computing. With the growth of the World Wide Web (WWW), interactive distributed applications have become a substantial part of popular computer usage. Web services based on Hypertext Markup Language (HTML) and Hypertext Transfer Protocol (HTTP) represent one type of distributed application. Other kinds of distributed applications include instant messaging, streaming media, and automated teller machines used by banks. Electronic mail (email) is an example of a non-interactive distributed application. Distributed applications are commonly implemented using the Internet, but can also be implemented using private wide area networks (intranets), virtual private networks (VPNs), or local area networks (LANs).

A significant problem for users and providers of network services can be the slow or poor performance of a distributed application. Software that enables the performance of distributed applications to be monitored is thus an important tool in analyzing such performance issues. However, measuring the delivery via protocols such as HTTP of content over the Internet is complicated by the federated nature of the Internet (compared to LANs or intranets), because the overall performance of the system depends not only on infrastructure that is directly controlled by the application provider, but also by a multitude of third parties. These third parties include the providers of collocation and hosting services (e.g., Rackspace, Netinfra, Digex), providers of Internet network connections (e.g., InterNAP, UUNet, and Cable & Wireless), multiple backbone providers (e.g., ATT, Sprint, MCI, UUNet, and Cable & Wireless), content delivery networks (CDNs) (e.g., Akamai, Mirror Image Internet, and Digital Island—a subsidiary of Cable & Wireless), advertising networks (e.g., Double-Click and Avenue-A), and consumer Internet service providers (ISPs) (e.g., AOL, Earthlink, MSN, and ATT Broadband Internet). Problems in any of these third party providers can lead to distributed application service degradation or failure, but the number of providers involved (literally thousands) and the limited visibility that an application provider generally has into these independently administered systems commonly makes service problems particularly difficult to detect and diagnose.

A critical aspect of addressing performance problems is measurement, so that problems can be detected quickly when they occur, and so that their specific domain of impact can be identified in support of problem diagnosis. A useful measurement technique is described in commonly assigned U.S. patent application Ser. No. 09/991,127, titled "METHOD AND SYSTEM FOR MONITORING THE PERFORMANCE OF A DISTRIBUTED APPLICATION," filed on Nov. 14, 2001, the specification and drawings of which are hereby specifically incorporated herein by reference. The above-noted patent application describes a technique for collecting certain "application level" metrics that provide an end-user's view of the performance of a distributed application. However, the above-noted patent application does not disclose details for the analysis of large bodies of data collected from a potentially large population of end-user access points, which may potentially be collected over an extended period of time. It would be desirable to provide a technique capable of monitoring an internetwork that is viable, but arbitrarily complex in terms of topology, geographic distribution, and fragmentation of administrative control. Today's Internet is exemplary of such a complex internetwork.

Before desirable characteristics of a technique capable of monitoring an internetwork can be defined, more detail regarding the characteristics of an internetwork needs to be provided. Conceptually, an internetwork generally assumes an Internet-style, host-addressing scheme, where communication end points are identified using positive integers as addresses. In the case of the Internet Protocol, version 4 (IPv4) based Internet, which is the version currently in use, these integers are 32 bits in length. IPv6 networks use 128-bit addresses. In general the addresses can be of any length, provided they are of sufficient length to uniquely identify all the hosts on the internetwork. In the context of a communications internetwork, the term "subnet" is commonly employed (relative to the IPv4 and the Internet) to describe a consecutive sequence of end point addresses. These address blocks may be aligned on boundaries that are exponential powers of 2, but this detail is not a requirement.

Two useful, related abstract concepts in the discussion of internetwork performance are the "core" and the "edge" of an internetwork. A modern internetwork such as the Internet consists of some number of well-connected, high capacity links. Commonly, in the United States, these links are operated by major telecommunications carriers, for example, AT&T, Sprint, and MCI/WorldCom. Also, these links are typically very well interconnected, with multiple redundant very-high-capacity connectivity points. These connectivity points are commonly called Network Access Points (NAPs). High performance links form the core of the internetwork. The modern Internet is commonly described as having a single core, although in reality, economic and geographic boundaries tend to complicate the topology somewhat. It should be recognized that direct or proximal connections to this core are the best choice for a commercially relevant distributed application, but such connections are expensive, and are generally therefore inappropriate for an end point connection, such as an end user's connection to their home. End users will typically connect through a "Consumer ISP" such as AOL or ATT Broadband Internet. The Consumer ISPs aggregate multiple end-users in special network centers commonly known as Points Of Presence (POPs). These POPs in turn are connected either directly or after additional aggregation to the core. The term "edge" is used herein to refer to the aggregation of all POPs and subsequent last-mile connections.

By way of analogy, the core is to an internetwork what the U.S. Interstate system is to the U.S. system of public roadways. The Interstate system is an aggregation of high capacity roads with high volume inter-connective points where the roads intersect. Although congestion does occur, in most cases these roads have been carefully designed and engineered to minimize such problems. Following this analogy, the Edge of the public road system comprises all of the roads that provide direct access to locations of interest, such as homes and offices. The Edge includes metropolitan surface streets, twisting residential grids, narrow twisting mountain roads, and limited access gravel roads. Just as it is impractical to have every home situated on an Interstate highway, it is generally impractical to have every internetwork end point directly connected to the internetwork core. As with the road system, connection end points are aggregated through a complex and arbitrary mesh of local connectivity with widely varying capacity and quality characteristics. When a person travels on a road, they often use major streets that are not directly connected to the destination and are not a part of the Interstate system; such roads represent a gray area between the core and the Edge of the road system. Similarly, by analogy, there is a gray area between the internetwork core and the edge. An important difference between the internetwork and the road network is that speeds on the computer network approach the speed of light; thus, "transcontinental" travel occurs with much greater frequency on the internetwork.

There are a number of specific problems that are currently faced by the administrators of distributed applications that rely on such a complex internetwork. Such distributed applications typically employ a number of third-party service providers to implement effective network communication between the application data center and the end point. These third-party service providers commonly include:

ISPs.
CDNs.
Advertising Networks.

ISPs provide connectivity between the application data center and the internetwork edge. Their role in the performance of the site is fundamental, providing the distributed application with the ability to establish a network connection with end users, as well as with the CDNs and other services on the internetwork. These carriers commonly operate large overlay networks with arbitrarily complex patterns of connectivity between the ISP and other parts of the Internet. Even though end point connectivity is the fundamental value of engaging an ISP, it is difficult or impossible in the status quo to evaluate an ISP based on the quality of end point connectivity it provides. More specifically, it is not possible to evaluate an ISP based on the quality of connectivity it provides to specific subnets on a commercial internetwork.

The concept of Autonomous System (AS) is related to the notion of an ISP. Whereas an ISP is fundamentally a unit of business organization, autonomous systems are a structural element of computer internetworks, corresponding to a set of links that are centrally managed and controlled. A reference useful for understanding autonomous systems and their role in the modem Internet is: BGP4: *Inter-Domain Routing in the Internet.* By John W. Stewart III, published by Addison-Wesley in 1999. It is easy to recognize that the modem Internet comprises many different autonomous systems, as each ISP manages and controls the network links it owns. It is very common for ISPs to be organized as multiple autonomous systems. In the status quo, it is difficult or impossible to evaluate an ISP based on the quality of connectivity it provides to the specific autonomous systems that form the Internet. As a consequence of the general inability to manage either subnets or autonomous systems, it is difficult or impossible to compare two ISPs based on their performance, or more generally, on their service, in terms of end point connectivity. Thus, it would be desirable to provide tools to enable users to quantitatively measure performance differences between two or more ISPs.

CDNs provide a service that magnifies the delivery power of a Web site by serving content components through a large distributed network of servers. In this way, they both increase the server resources available to a Web site and shorten the effective network distance between the content components and the communication end points. In such a deployment, the servers that are owned, operated, and dedicated to a specific Web site are commonly known as "origin servers," and such terminology is employed herein. Although end point connectivity is the fundamental value provided by CDNs, it is generally not currently possible to evaluate a CDN based on the quality of connectivity it provides using conventional techniques. Even though the fundamental value of a CDN is improved end point connectivity, it is not generally currently possible, with existing techniques, to evaluate the quality of service provided by a CDN based on performance delivered to specific subnets. It would therefore be desirable to provide tools to enable users to quantitatively measure performance differences between two or more CDNs.

Additionally, there are certain factors relating to CDNs that impact both the performance and the cost of CDN services, but these factors are generally not available in an operational way to site administrators who control an application's use of the CDN. To understand these considerations, it should be understood that CDNs function by providing a cache of distributed application content on a distributed network of servers that are generally closer to the communication's end point than the main distributed application data center(s). Those of ordinary skill in the art will appreciate that the effectiveness of these caches, as with all caches, depends fundamentally on the property of locality of reference, the basic notion being that if a particular item is referenced at time t, then it is likely that it will be referenced again soon thereafter. On an internetwork, popular content has better locality of reference than content that is rarely accessed. Because of the properties of caches, the CDN will generally be effective and beneficial for delivering content with good locality. However, when content has poor locality, the CDN will generally be less beneficial, and in some common cases, can even negatively impact the performance of content delivery. The negative impact can occur because in the case of a cache miss, the CDN creates a middleman that imposes an additional step, the cache miss, to the process of retrieval of content components by the communications end point. When poor-locality content is delivered by a CDN, the distributed application suffers a double penalty—not only is application performance made worse, but the application managers must pay the CDN a fee for this reduced quality of service.

Typically, CDN customers are unaware of these subtle points of CDN performance. They arbitrarily use the CDN to deliver as much of their content as possible, with little genuine knowledge as to when the CDN is beneficial and when it is not. However, for those with a deeper understanding of CDN performance, the situation does not significantly improve. Knowledgeable users may understand that some content is very popular and is more likely to benefit from the CDN, while other content that is unpopular is less likely to benefit from a CDN. However, between "very popular" and "unpopular," there is a vast continuum where most content lies. Currently, CDN customers have no effective means to measure the content that benefits from a CDN and the content that does not. It would thus be desirable to provide tools to enable users to quantitatively determine the content that can benefit from employing the services of a CDN and how much of a benefit will be provided by using a CDN.

An Advertising Network is similar to a CDN in that content components (in this case advertisements) are delivered by a third party. Commonly, the advertising networks will either use a CDN or will have a structure similar to a CDN to insure that the content is delivered with acceptable performance. As with CDNs, the same lack of performance insight generally applies. It would again be desirable to provide tools to enable users to quantitatively measure performance differences between two or more different advertising networks, streaming media delivery networks, and other third-party content delivery systems.

In context of this disclosure, the end point of a distributed application could be an end-user operating a Web browser, as with the modem Internet. Alternatively, as used herein, it will be understood the end point may take a number of other forms. For example, an end point may comprise an "agent," i.e., a computer system acting with some degree of autonomy on behalf of an end user. An end point may also be a component of another distributed application, as suggested by the architectural description of the Java 2 Enterprise Edition (J2EE) environment or of Microsoft Corporation's ".NET" initiative.

Although numerous performance management solutions are available in the status quo to monitor distributed application performance, they all have major shortcomings with respect to the problems discussed above. Most performance management software products can be categorized as "system monitoring" products. While such system monitoring products are quite useful and effective for monitoring and maintaining a Web server or a database, they are generally ineffective at addressing the internetwork problems described above. Referring once again to the highway analogy, tools for diagnosing an automobile system problem such as the engine are generally not useful for diagnosing congested highway conditions. There are many popular sources for system monitoring solutions, such as Freshwater SiteSeer™ and Keynote Red Alert™, and numerous product offerings from Hewlett Packard, NetIQ, BMC Software, Tivoli, Computer Associates, Precise Software, and Quest Software.

Web Site Perspective™ software from Keynote Systems is one of the most popular tools for monitoring CDN and ISP performance. Substantially similar offerings include Topaz Active Watch™ from Mercury Interactive, and the Gomez Performance Network™, all of which are delivered as managed services. These systems work by generating a stream of test traffic from load-generation robots. The robots are placed at locations distributed throughout the internetwork. The reliable streams of test traffic generated by these robotic systems are very effective for monitoring Web site availability and for obtaining a baseline measure of system performance. These systems have serious limitations in terms of the problems described above, all of which are ultimately related to the cost of generating artificial test traffic from robots. The cost of generating artificial traffic from a robot is related directly to the cost of deploying and maintaining a remote robot. There are significant capital outlays for highly reliable hardware, software, and networking equipment. There are also significant operating expenses for hosting these systems and for providing network connectivity. As a result, the cost per managed Web page for these systems is quite high, commonly from $150–$1,000 per month per managed document. More specifically, the following are general limitations for Keynote-style performance management solutions:

Monitoring all content. To solve the content-related problems described above, it is generally necessary to collect management data for all the content delivered by a distributed application. For a typical Web sites with several hundred distinct documents, the management cost for a Keynote-style solution would be $15,000–$100,000 per month. Such fees are not generally supported by the economics of a modem Web site.

Collecting adequate metrics. Keynote-style management solutions does not provide a number of useful metrics, such as render time and sizes for document components. Metrics that are available from Keynote-style solutions are generally limited either by manual "experiments," or by significant additional expense.

Limited number of robots. Due to cost considerations, the size of a robot network is usually limited to several hundred locations. When one recognizes that Akamai started its CDN with over 2,000 caches, and that there are over a million independently administered subnets on the Internet, it is clear that such a small network of monitoring robots will be severely limited, and most problems will be concealed by the vastness of the internetwork edge.

Monitoring from the network edge. Keynote-style networks typically locate monitors within or near the internetwork core. This characteristic is motivated in part by the availability of access to multiple locations on the network topological from a single physical location, and also by the availability of high-quality hosting services. The vastness and relative remoteness of the network edge makes it economically very difficult for a robot network to monitor from the edge.

It would therefore be desirable to provide tools to enable users to quantitatively measure performance issues across a distributed network that monitors from the edge of such a distributed network.

The Topaz Active Watch™ product from Mercury Interactive represents another popular approach to distributed application performance monitoring. Similar offerings are available from Adlex. Like the site monitoring tools mentioned above, Topaz Active Watch™ is a software product that is deployed within the data center of the distributed application. However, rather than monitoring server internals, the Topaz Active Watch™ system monitors network traffic on the data center LAN. By reconstructing TCP/IP connections, it is frequently able to extract useful performance measurements for content delivered from the data center. It avoids the cost of the Keynote-style solutions, removing an economic barrier to managing all the content for the distributed application. Topaz Active Watch™ is limited in that it is unable to measure CDN performance, which cannot generally be observed from within the data center or from the data center LAN. It is further limited in that it is generally unable to measure and compare the performance experienced by an arbitrary internetwork subnet for content served from two distinct ISPs. It would be desirable to provide tools to enable users to quantitatively measure performance issues across a distributed network, working from the edge of such a distributed network, such that CDN performance can be measured.

Other solutions, some of which are of a complementary nature to the present invention, include services and tools such as those from Vividence, which provide subjective information on the experience of an end-user of a distributed application (e.g., "I liked this, but I didn't like that."). Although performance has impact on this subjective experience, it becomes difficult to isolate and act on performance issues when quantitative performance data are blended indiscriminately with subjective opinions about experience. A further problem is that the cost of interrogating end-users makes it impractical to apply a Vividence approach to performance measurement of a wide-scale detailed internetwork measurement. Solutions such as Web Trends™ products and services from NetIQ, Hit BOX™ services from Web Side Story, and Funnel Web™ from Quest Software provide ample statistics on usage of a Web site, but do little to expose network performance. Offerings from WebHancer are expected to be useful as a data source to be utilized in accord with the present invention, as will be described in more detail below. It would be desirable to provide tools to enable users to quantitatively measure performance issues across a distributed network by analyzing data obtained from other sources.

Finally, it should be noted that the technology described in the above-referenced patent application is employed in the invention described in the patent application that has been incorporated herein by reference, which provides limited internetwork analysis functionality. However, the invention in that other patent application does not provide the full range of desirable utility described above. It would therefore be desirable to provide tools to enable users to quantitatively measure performance issues across a distributed network, working from the edges of such a distributed network, such that CDN performance, ISP performance, advertising network performance, streaming media delivery network performance, and third-party content delivery system performance can be measured in a cost effective manner.

SUMMARY OF THE INVENTION

One aspect of the present invention is a method of analyzing the performance of a distributed application across an internetwork. The analysis requires the use of a set of performance records relating to the distributed application, obtained from a plurality of end points of the internetwork. Each performance record includes measurements from two (or more) independent content sources. The performance records can be generated specifically for the purpose of analyzing the performance of a distributed application across an internetwork, or can comprise performance records generated for some other purpose. For each performance record, a metric is computed that reveals a relative performance of the independent content sources.

The metrics are analyzed according to relationships in the internetwork structure, to determine a relative performance of the two independent content sources by quantifying the performance of the distributed application with respect to one of the independent content sources relative to a standard defined by the other independent content sources. Preferably, the analysis includes computing a baseline metric, wherein the baseline metric is the mean of the metrics for the set of all performance records, and classifying the metrics for the set of performance records according to the internetwork structure, such that metrics corresponding to related internetwork structures are grouped together in the same class. For each class of metrics corresponding to related internetwork structures, an average metric for the class is determined. The average metric for each class is compared to the baseline metric. This comparison can lead to logical responses for improving the performance of the distributed application.

For example, consider a distributed application in which HTML Web pages are supplied to clients from an origin server, and images included on the Web pages are supplied to the clients from a CDN when the web pages are displayed. The fetch time for the HTML content supplied from the origin server and the render time for the image content supplied from the CDN comprise measurements useful for determining metrics indicative of the relative performance of the system. The metrics calculated from these measurements can be grouped into classes corresponding to end points that reside on the same autonomous system. Comparing the average metric for each class with a baseline metric for all end points enables autonomous systems having a poorer than average performance (as compared to the baseline performance) to be easily identified. Once poorly performing autonomous systems are identified, performance enhancing techniques can be considered. For example, the CDN might place caches closer to poorly performing end points.

It is preferable for the metric to be a ratio of measurements for retrieving content of a distributed application from remote locations in the internetwork and processing or displaying the content at an end point. Thus, the ratio can be the render time for an image obtained from one source divided by the fetch time for an HTML Web page obtained from a different source, or the ratio of the fetch times for different frames of a Web page that are supplied from different sources. In another embodiment, the ratio can be two bandwidths measured for obtaining content from different sources.

Another aspect of the present invention is a method for analyzing the performance of a distributed application across an internetwork, using performance data that relate to at least two different content sources. The method includes the step of identifying the type of internetwork structures for which the relative performance of the distributed application will be analyzed, since the type of content will determine the appropriate measurement that should be made.

After identifying the appropriate internetwork structures and measuring the performance data, a performance metric for the identified type of internetwork structure is computed in terms of the performance data, such that each such metric is determined based upon measurements from at least two different content sources. Preferably, the defined performance metric is a ratio, with the numerator of the ratio including measurements for at least one content source, and the denominator including measurements for at least one different content source. Numerical results are thus computed, based on the defined performance metric and the performance data. A comparison of the numerical results quantifies a relative performance of the distributed application. Another aspect of the present invention is directed to an article of manufacture that includes a medium on which machine instructions are stored. The machine instructions cause a processor to implement functions generally consistent with the steps of the method discussed above.

A still further aspect of the present invention is directed to a system including a memory in which a plurality of machine instructions are stored, a display, and a processor coupled to the memory and the display. The processor executes the machine instructions to implement functions that are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
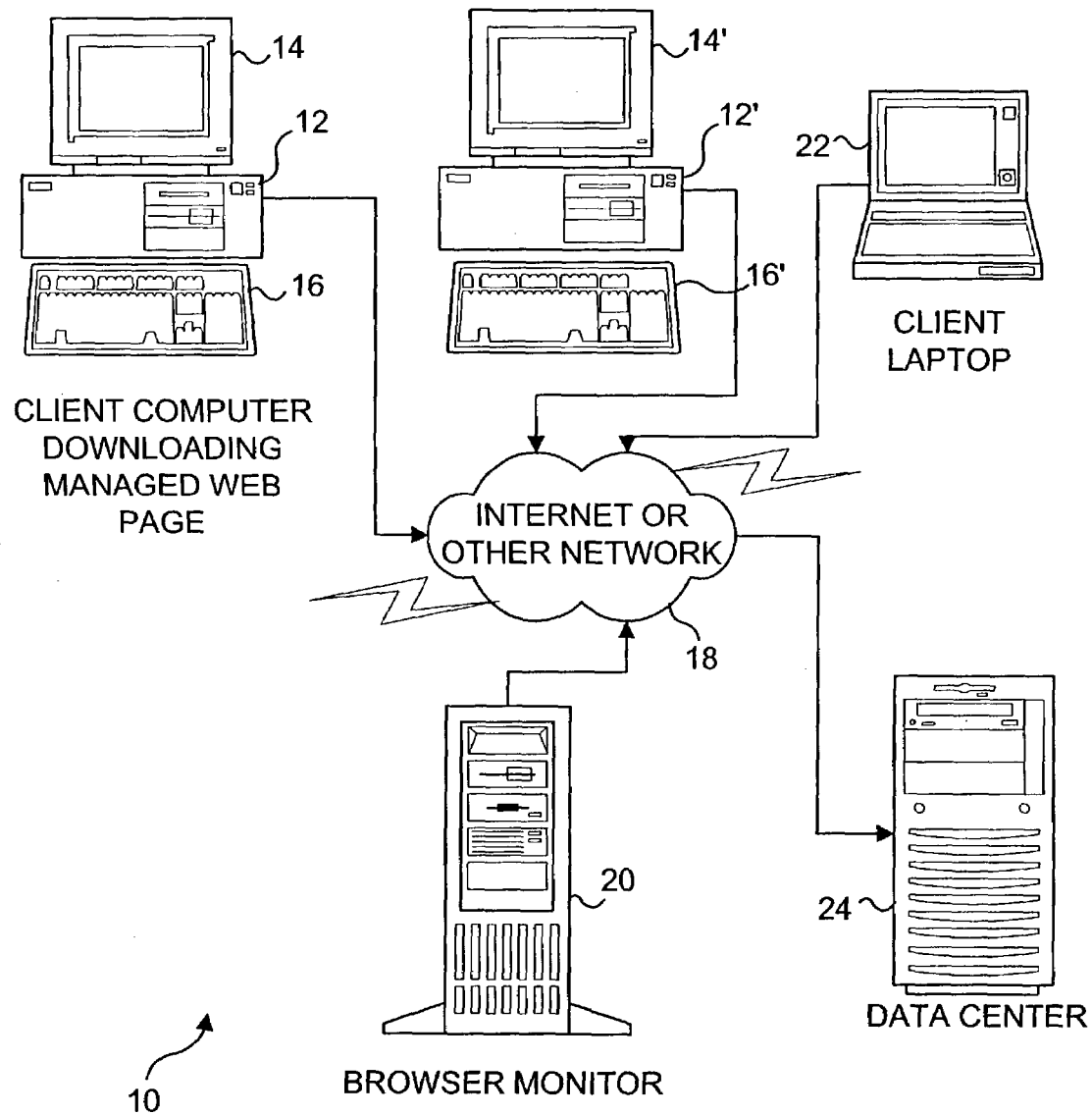
FIG. 1 is a schematic diagram showing exemplary client computers coupled in a network with a server computer and with a data center at which performance metrics are selectively collected and processed.

The present invention is a method of analyzing response time data collected from a plurality of hosts on an internetwork. The analysis serves to quantify internetwork performance and further, to identify specific performance problems manifest at the edge of the internetwork, where the users of the internetwork reside. Preferably, the data to be processed are derived from a large and diverse base of client computers. An exemplary data source for use in conjunction with the present invention is the product described in the above-noted patent application that has been incorporated herein by reference, although other data sources can alternatively be employed.

The term "Web page" as used herein refers to "distributed application content," while the term "Web site" is used to refer more generally to a distributed application. Distributed application content thus refers to a document and components comprising the document that are retrieved as a part of processing or "rendering" the document and its components. HTML documents, Standard Meta Language (SML) documents, and eXtensible Markup Language (XML) documents are examples of distributed application content. "Fetch time" as used herein refers to the time required to retrieve a base document. For example, in the case of a Web browser, the base document will typically be the HTML document referenced by a Uniform Resource Locator (URL) that is being displayed by the browser. "Render time" as used herein refers to the time to retrieve an image or other object and fully display the image or other object in a browser program at an end point. It should be noted that these definitions are consistent with those employed in the specification of the commonly assigned patent application specifically incorporated herein by reference above. "Performance record" as used herein refers to performance statistics (including render and fetch time) for the event of a specific Web page or subnet being loaded by a specific end point.

"Content source" as used herein refers to the internetwork entity where a specific content is stored and served to a browser program that is accessing the content. For example, a Web page that includes both text and graphics often stores the text and image portions in different locations. Even different images or different frames on a Web page can be stored at different locations. The code (such as HTML or XML) defining the Web page will include links (i.e., URLs) for the specific internetwork location of the text or image required to display the Web page and its components on a user's computer. The browser automatically retrieves the required content from the indicated source. Generally, content sources are servers where the content is stored so that it can be accessed by a client that is accessing a Web page in which the content is a component. If a Web page does not include components stored on another source, but is instead, stored in its entirety on a single server, that server is then the content source for the Web page. The term "end point" of an internetwork refers to a user device that accesses content from a content source. A subnet includes a plurality of end points that are related in the manner in which the end points access the internetwork.

The analysis of the present invention is facilitated by a number of novel performance metrics. Several of these metrics are discussed in detail below, and specific examples of the use of those metrics are provided. Before providing a detailed discussion of the present invention, it will be useful to discuss it in more general terms.

One aspect of the present invention is directed to a method for analyzing the performance of a distributed application across an internetwork, using performance data for at least two different content sources. The present invention analyzes the performance data with respect to internetwork structures. For example, the relative performance of different image servers, each of which are used to store images used in a Web page, can be analyzed to determine which of the image servers offers superior performance relative to the other image servers. Alternatively, a plurality of different content sources can be analyzed using the present invention. An important element of the present invention is utilizing performance data that includes measurements from at least two different content sources.

The performance data can be collected from a single end point of the network, or the performance data can be collected from a plurality of different end points comprising a subnet, or from end points in different subnets. An advantage of using performance data collected from a plurality of end points is that the present invention enables an evaluation of how well an internetwork structure is connected to a content source, relative to other internetwork structures. It should also be noted that for sets of performance data collected for a plurality of different end points or subnets, the performance data preferably include details regarding the end points from which the data were collected, so that the performance data can be organized based on the collection end points. This approach enables the present invention to analyze the relative performance of a distributed application with respect to specific types of internetwork structures from different end points or subnets, as discussed in greater detail below.

As previously noted, the present invention analyzes the performance data with respect to internetwork structures. Thus, a basic step is to categorize or classify performance data according to internetwork structures. One method for doing this categorization or classification would be to collect performance data related to internetwork structures of particular interest (i.e., such as data for image servers provided by a CDN) that are accessed from different subnets. However, it is contemplated that it will be particularly beneficial to utilize performance data already collected by existing software tools, and then to manipulate that performance data according to the present invention. When performance data have previously been collected for other purposes, such performance data typically relates to several different types of internetwork structures. When a large volume of performance data are already available, it is contemplated that a useful approach will be to process all of the performance data available, and then to group performance data related by some common aspect of the internetwork structure.

Once the appropriate internetwork structures and performance data have been obtained and identified, a performance metric for each specific type of internetwork structure is defined using the performance data, such that each metric so defined includes measurements for at least two different content sources. Numerical results for each internetwork structure of the same type are determined based on the defined performance metric and the performance data. These numerical results can then be compared to determine a relative performance of the distributed application with respect to the similar internetwork structures thus identified.

Preferably, the defined performance metric is a ratio, with the numerator of the ratio including measurements from at least one content source, and the denominator including measurements from at least one different content source. Preferably, the performance data are related and are expressed in the same units, such that the units cancel, and the ratio is dimensionless. For example, if the numerator of the ratio compares throughput (bytes of data transferred per unit of time), the denominator should also be expressed in the same dimensions, so that the units cancel. The ratio defining the performance metric can also represent more than two content sources.

Performance data for use in determining a performance metric can be predetermined, and as such, the step of determining performance metrics may only require that the ratio of appropriate performance metrics be computed. Under such circumstances, the set of performance records will be used to compute the performance metric, which are then categorized according to internetwork structure.

One example of a useful performance metric is the ratio of the render time divided by the fetch time (i.e., the RF ratio). The RF ratio for a set of related performance records can be summarized by computing the mean or other summary statistic of the RF ratio for the performance records. The arithmetic mean is only one measure of central tendency, but other measures of central tendency can alternatively be used, such as, median, mode, geometric mean, trimmed mean, etc. Accordingly, for purposes of determining the scope of the claims that follow, such alternatives should be considered the equivalent of "mean."

Example of useful sets of performance records include:
records for the same Web page.
records for the same internetwork subnet.
records for the same autonomous system.
records for the same economic, geological, or political entity (such as a city, state, or country).
records for the same software configuration (such as Web browser or desktop operating system).

Many other set formulations are possible.

It may be helpful for better understanding the present invention to consider an example in which the RF ratio is determined from performance measurements of two independent content sources, such as a CDN and an origin server. This approach is in contrast to simpler metrics such as fetch time, which typically pertain to a single content source. However, it should be noted that in some applications of the present invention, the ratio of many other performance measurements can also be used to evaluate and analyze the performance of two sources. For example, the ratio of the fetch time for a Web page frame loaded from one server, to the fetch time for another frame supplied by a different server, may provide useful information.

Other prior art measures in popular use combine metrics in ways that fail to reveal the relative performance of the two content sources. For example, when response time is computed in the prior art as the sum of fetch time and render time, the relative performance of the two content sources supplying an HTML document and images referenced in the document is lost. The analytic power gained by this dual measurement can be likened to stereo vision. It is possible to perceive an image with one eye, but stereo vision is necessary for image-to-image comparisons that enable depth perception. Similarly, measurement of a single content source provides a flat view of internetwork performance. By comparing measurements of two content sources and analyzing them according to internetwork structure, it is possible to recognize differences in the relative performance of the content sources and to quantify performance of one content source relative to the standard defined by the other.

With respect to the example of the RF ratio, the numerator (the render time) corresponds to the performance of a first content source, and the denominator (the fetch time) corresponds to the performance of a second content source. The fetch time is the time required to fetch the HTML corresponding to a particular Web page from a source, such as an origin server (i.e., the server where the HTML defining the Web page is stored). The render time is the time required to download and render an image that is referenced on the Web page, from a server on which the image is stored. Therefore, the RF ratio relates to two different content sources.

For greater precision in content analysis, a bandwidth ratio can be employed. Thus, in regard to the above example, the RF ratio can be replaced with an "RFB ratio," which is computed by dividing a render bandwidth by a fetch bandwidth. The render bandwidth is simply the number of bytes downloaded during rendering the images required by an HTML document, divided by the image download time in seconds. Similarly, the fetch bandwidth is equal to the number bytes downloaded when fetching an HTML document, divided by the download time in seconds. Although a ratio of metrics such as the RF ratio is adequate for many measures of network service quality, the ratio of bandwidths such as the RFB ratio can provide more accurate information for content evaluation, content acceleration services, and network connection quality. Empirical testing has indicated that ratios of metrics, such as the RF ratio, perform well when analyzing different subnets, and that bandwidth ratios, such as the RFB ratio, work well when analyzing different Web pages.

Figure 3:
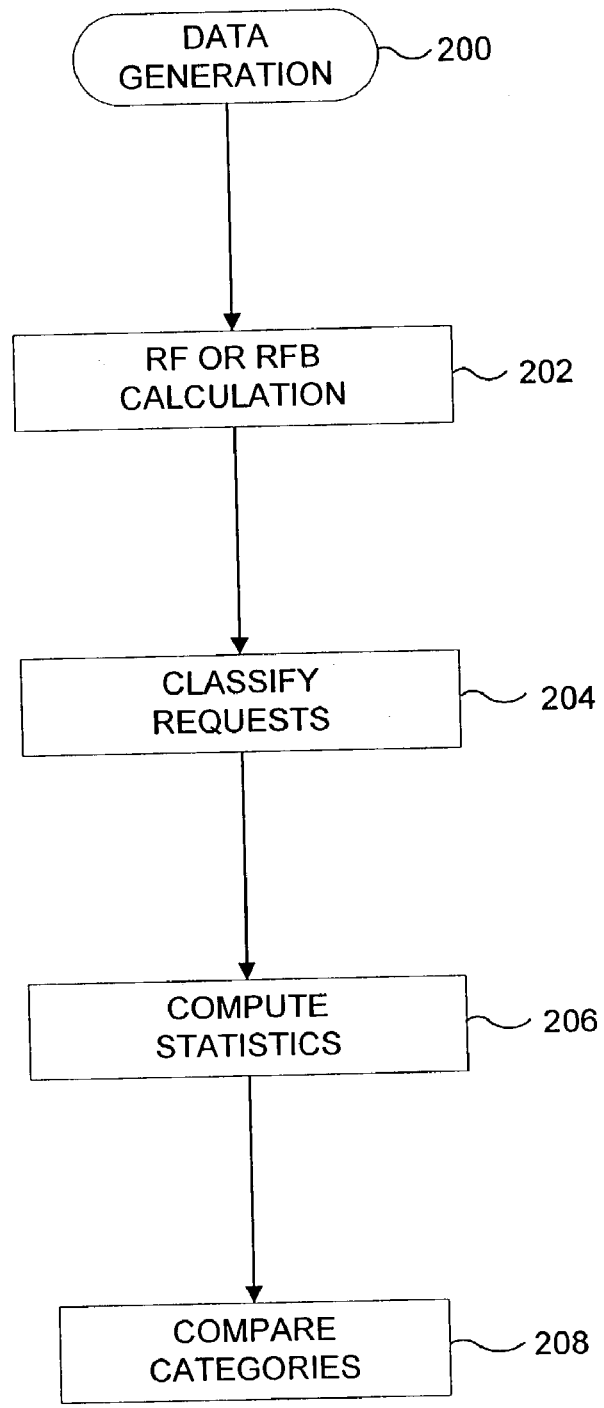
FIG. 3 is a flow chart illustrating a series of logical steps implemented for monitoring the performance of a distributed application in accord with the present invention.

FIG. 3 illustrates the overall sequence of steps employed to analyze the performance of a distributed application using one of the ratios discussed above, in accord with the present invention. In a block 200, data are generated. It should be understood that the data employed can be generated specifically to enable the analysis of the present invention, or such data may have been generated for some other purpose. As noted above, an exemplary data source for use in conjunction with the present invention is produced by the invention described in the patent application that has been incorporated herein by reference, as indicated above, although other data sources can alternatively be employed. It is contemplated that the following types of data will be useful: records for the same Web page; records for the same internetwork subnet; records for the same autonomous system; records for the same economic, geological, or political entity (such as a city, state, or country); and, records for the same software configuration (such as Web browser or desktop operating system).

In a block 202, either the RF ratio or the RFB ratio is calculated. In a block 204, each ratio (RF or RFB) is classified based on the type of data used to determine the ratio, so that similar types of data will be compared. Preferably, this classification identifies the set of data records for end points in that subnet.

In a block 206, the average RF ratio or RFB ratio, as appropriate, is calculated for each set of records classified in block 206. The baseline ratio (i.e., the baseline RF ratio or the baseline RFB ratio) is also calculated using all records. In a block 208, for each category, the baseline ratio (RF or RFB) is compared to the average ratio (RF or RFB) for that subnet.

The following tables illustrates how comparing RF or RFB ratios from such sets can be useful to analyze relative performance of distributed applications, and how such comparisons can lead to conclusions about how to improve performance.

TABLE 1

URL Example. In this example, the URLs from a Web site are ranked in terms of their RFB ratio. In this instance, the Web site was not using a CDN, so the ranking serves to indicate the pages that will likely benefit the most from the improved rendering performance that a CDN might provide.

| | |
|---|---|
| browserupgrade.asp | 11.53 |
| roadracing/popup.asp | 8.75 |
| offroad/teamdetail.asp | 6.11 |
| help.asp | 4.25 |
| motocross/teamdetail.asp | 3.99 |
| offroad/popup.asp | 3.72 |
| landing.asp | 3.65 |
| roadracing/teamdetail.asp | 3.5 |
| community/featuredracer.asp | 3.27 |
| motocross/popup.asp | 2.76 |

TABLE 2

ASN Example. This example shows BGP4 autonomous systems ranked by RF ratio. This Web site was not accelerated by a CDN. These statistics indicate which network subnets have the biggest potential benefit from CDN acceleration. The actual benefit will depend, of course, on the effectiveness of the CDN.

| | |
|---|---|
| GROUPTLCOM | 7.06 |
| TELUS | 4.84 |
| ATT-BROADBAND | 4.66 |
| BAIS14 | 4.65 |
| IBM-MMD-AS | 4.57 |
| CABLE-NET-1 | 4.56 |
| CHINALINK | 4.45 |
| TELERGYNET | 4.45 |
| HINET-AS | 4.32 |
| BATI-MIA | 4.27 |

The present invention can be used to evaluate the performance of a CDN to a Web site in terms of internetwork subnets in the following manner, noting that CDN performance often relates directly to render time (as the CDN delivers the images and other page components), and origin server performance relates directly to fetch time (as the base HTML document is typically delivered from the origin server). Clearly, the ratio of other metrics can be employed, and other sources of content can be evaluated with the present invention.

Figure 4:
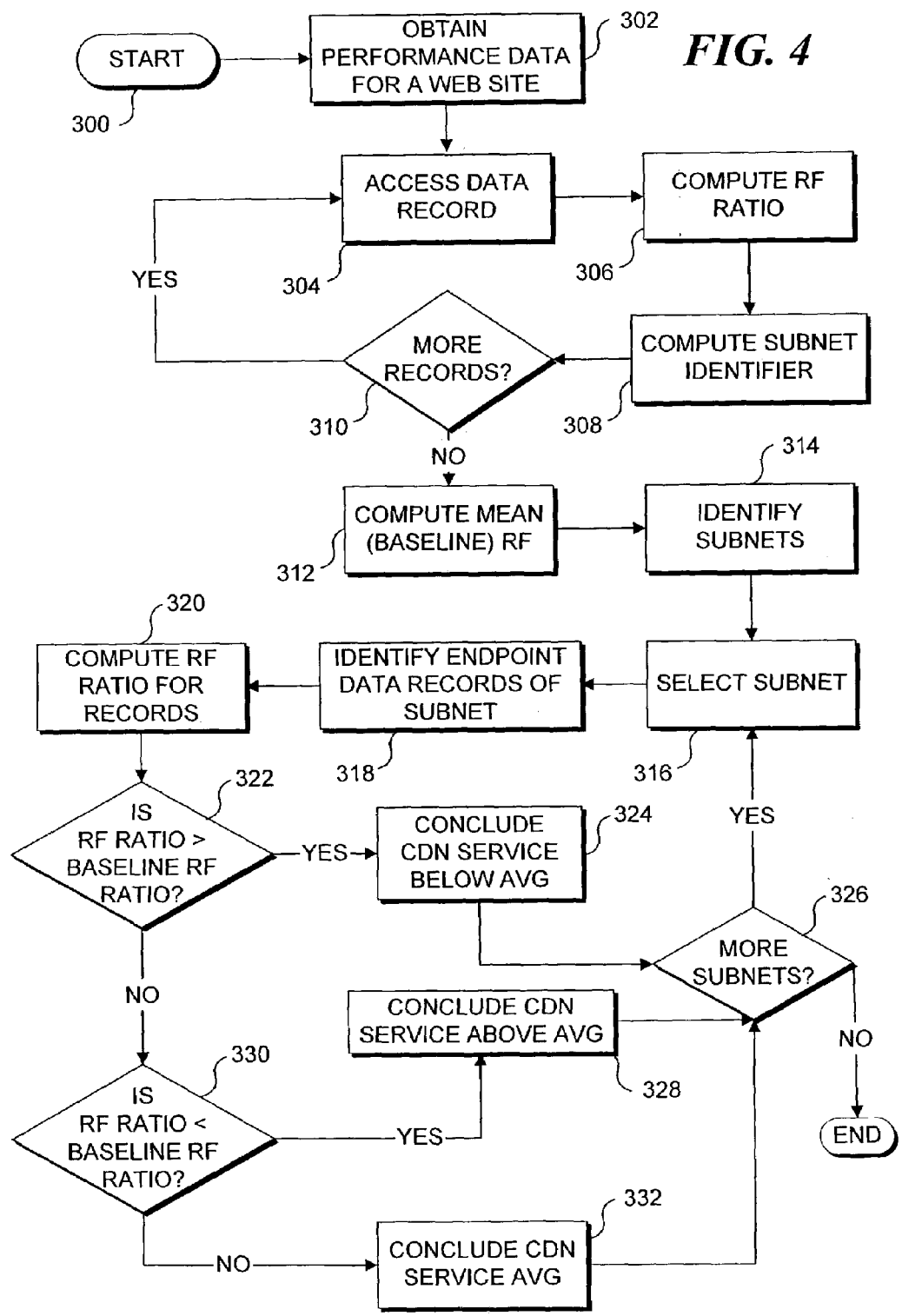
FIG. 4 is a block diagram illustrating in greater detail the logical steps of a method for monitoring the performance of a CDN in accord with the present invention.

FIG. 4 is a block diagram that illustrates the steps to evaluate the performance of a CDN to a Web site in terms of internetwork subnets using the RF ratio. Starting from a block 300, performance data are obtained in a block 302. In a block 304, a data record is accessed, and the RF ratio for that data record is determined in a block 306. In a block 308 the subnet identifier for the data record is computed. Then, in a block 310, the logic determines if any more data records exist. If so, the logic returns to block 304, and the next data record is accessed. If, in decision block 310, no more records exist, the logic proceeds to a block 312, and the baseline RF ratio is determined. In a block 314, each different subnet is identified.

Next, in a block 316, a particular subnet is selected. The data records corresponding to end points of the subnet are identified in a block 318, and in a block 320, the average RF ratio for that set of records is determined. In a decision block 322, the average RF ratio for that set of records is compared to the baseline RF ratio, and if the average RF ratio is larger, it is concluded in a block 324 that CDN service for the current subnet is below average. If it is determined that there are no more subnets in a decision block 326, the process terminates. However, if more subnets exist, then a next subnet is selected in block 316, and the process is repeated for the next subnet.

Returning to decision block 322, if the average RF ratio for that subnet is not greater than the baseline RF ratio, then a decision block 322 determines if the average RF ratio for that subnet is less than the baseline RF ratio. If in decision block 330, the logic determines that the average RF ratio for that subnet is less than the baseline RF ratio, it is concluded in a block 328 that CDN service for that subnet is above average. If in decision block 330, it is determined that the average RF ratio for that subnet is not less than the baseline RF ratio (i.e., the average RF ratio=the baseline RF ratio), then, in a block 332, the logic determines that CDN service for the current subnet is average. Regardless of the branch exiting decision block 330, each path returns to decision block 326 to determine if additional subnets need to be analyzed.

After each of the above computations, the subnets can be ranked in terms of their RF ratios, enabling the subnets with the worst relative performance to be easily identified. As an alternative to the "site RF ratio," a baseline RF ratio might be obtained from historical data, from internal performance objectives, from another Web site, or from the terms of a service level agreement. If under-performing subnets are identified, the Web site administrator can evaluate the severity of the problem, both in terms of additional performance statistics, and volume of site traffic for that subnet. The above logic can easily be generalized to identify the worst performing countries, ASNs, etc., by simply using these structures rather than internetwork subnets to partition the address space of distributed application end points.

The above method also supports evaluation of the origin server ISP, as the subnets that receive the worst performance from the origin ISP (relative to the performance of the CDN) will have the lowest RF ratio and can be identified at the bottom of the list. With this information in hand, the site administrator can evaluate the gravity of the problem for those specific blocks of end-users and consider appropriate actions, such as filing a trouble ticket or engaging a different ISP. If both the CDN and the ISP perform badly for a particular subnet, the RF ratio for that subnet will be average, but the response time for that subnet will be particularly poor. Tools specific to response time problems are disclosed in the patent application that has been specifically incorporated herein by reference, as noted above.

A similar method can be used to evaluate the relative performance benefit of the CDN for each Web page. For greater precision in content analysis, the RF ratio (or other ratio of such metrics) can be replaced with an RFB ratio. Although the RF ratio is adequate for many measures of network service quality, the RFB ratio can provide more accurate information for both content acceleration and network connection quality.

Figure 5:
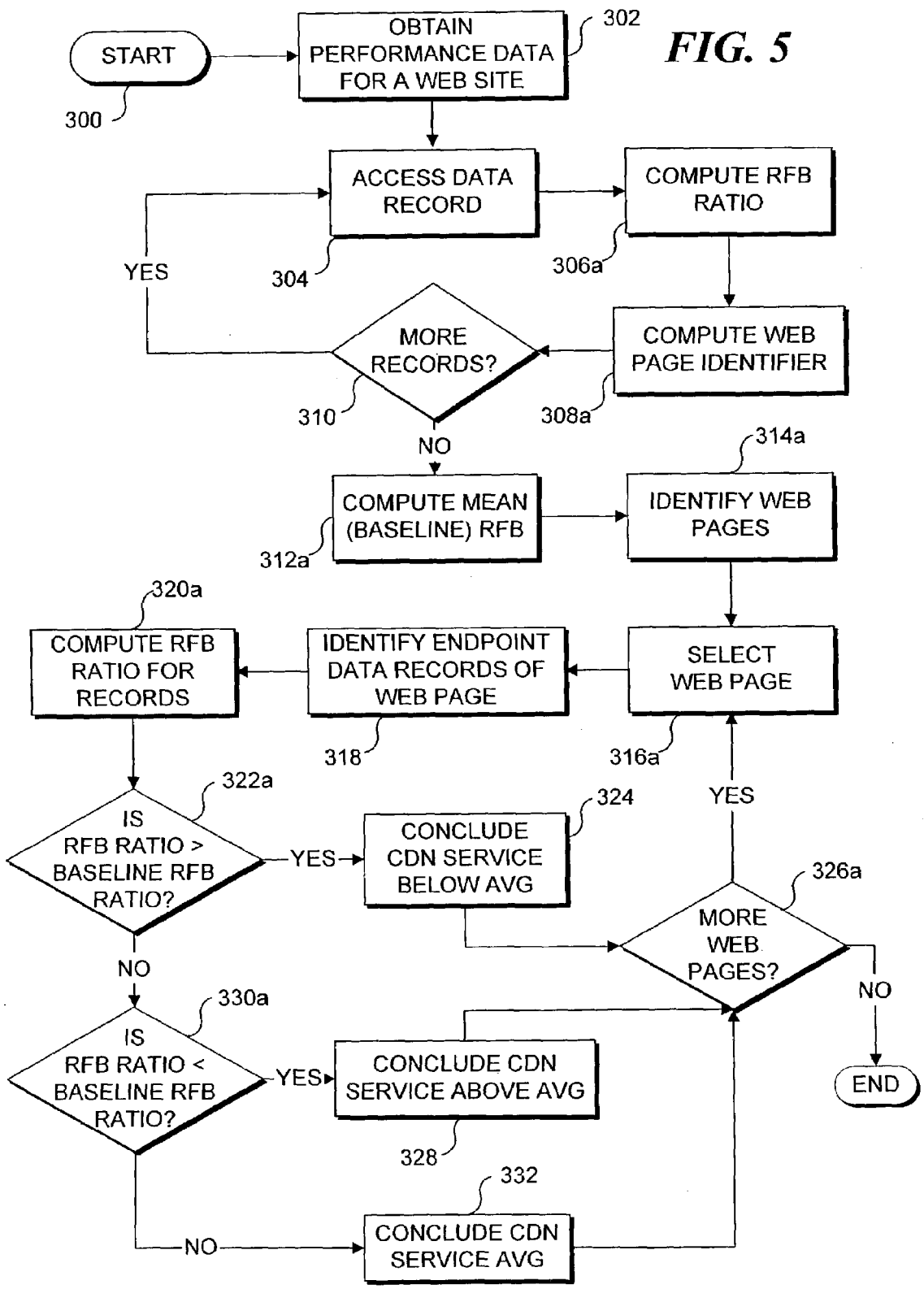
FIG. 5 is a block diagram illustrating in the logical steps of a method for monitoring the performance of a CDN using RFB ratios in place of RF ratios, in accord with the present invention.

FIG. 5 is a flow chart that illustrates the logical steps implemented by the present invention in evaluating the performance of a CDN to a Web site in terms of Web pages using the RFB ratio instead of the RF ratio. The steps are substantially similar to those described above with respect to FIG. 4, except that in steps 306a, 312a, 320a, 322a, and 330a, the RFB ratio is employed instead of the RF ratio, and in steps 308a, 314a, 316a, and 326a, the data correspond to Web pages, not subnets. All other steps have the same reference numbers as in FIG. 4.

When this analysis is complete, the Web pages represented in the data set can be ranked in terms of relative performance, with relative CDN performance being worst for the pages with the lowest RFB ratio. From this analysis, the site administrator can immediately identify the pages that benefit the most and the least from the CDN, facilitating decisions about the pages that should be accelerated with the CDN.

Use of render time and fetch time easily generalizes to use of response times for requests to servers on any two independent ISPs, suggesting an ISP-to-ISP ratio. This metric can be generalized to content fetched from any number of ISPs as follows. Assume a set of ISPs, including ISP1, . . . ISPn, and a goal of measuring the performance of ISPi relative to the other ISPs. Define two metrics, Mi and Mx, where Mi is the average response time for requests to ISPi, and Mx is the average response time for fetches to the other ISPs. In this instance, the performance of ISPi relative to the others can be analyzed by replacing the RF ratio in the above method with the ratio Mi/Mx. This step enables the comparison to be generalized across an arbitrary number of ISPs. Of key importance in this case is the generation of an appropriate data set. Whereas current popular Web site architectures commonly use both CDNs and origin servers, it is not a common practice to create content that uses multiple ISPs, as described above. It is contemplated that in the future, the value of the information on ISP and Web service quality will be recognized to the extent that would justify limited deployment of appropriate content on a popular Web site. This formulation is also applicable when content from multiple independent Web services are accessed in responding to a request from an end point.

The techniques described above assume an adequate input data set. As with any statistical technique, this method will provide inconsistent results when the data set is too small to effectively represent system behavior.

Exemplary System for Implementing the Present Invention

As shown in FIG. 1, an exemplary system 10 on which the present invention can be implemented includes at least one computer that receives the distributed application data from a source. More specifically, in this greatly simplified illustration, a processor chassis 12, an optional display 14, and a keyboard 16 comprise one client computer that employs a browser program to transmit a request for downloading a managed Web page over Internet 18 (or other network) to a browser monitor 20. Browser monitor 20 executes a performance monitoring function in connection with downloading managed Web pages to client computers. Other computers (clients) typically will include a similar processor chassis 12', a similar display 14', and a similar keyboard 16', or as shown, may be configured differently, such as a client laptop computer 22. The Web page or other distributed application data transferred to a requesting client computer over the network includes the JavaScript code or a reference for accessing the code that is used for implementing a browser monitoring function. The browser monitoring function performed within the browser program running on that client computer typically determines a plurality of performance metrics. The resulting performance metric data can be separately transferred over the network, or transferred as a batch when a request for another Web page and transmitted over the network. Browser monitor 20 can collect and process the performance metric data itself and can be either a client or a server computer, or preferably, the performance metric data will be collected and processed by another computer that is disposed remotely at a data center 24. The performance metric data that are collected can then be employed to produce reports and charts showing the condition of a distributed application for use by those managing the distributed application.

Since the data center can quickly become overloaded with incoming performance metric data being transferred to it by a multitude of servers and client computers, it is contemplated that the data center may optionally apply a probability function in selectively accepting the performance data to reduce the load experienced by the center. Alternatively, the browser monitor can apply the probability function in determining whether to collect and transfer performance metrics to the data center. The browser monitor and other monitors may include logic by which they delay or abort data transfers based on information obtained locally. For example, these performance monitors can recognize that a communication failure has occurred when attempting to communicate the performance metric to another site, such as the central data collection facility, and as a result, defer or omit a data transfer. In this way, the performance monitors avoid provoking load-induced failure on the central data collection facility. Also, the probability function can be applied on either a per-session or on a per-request basis, so that only a desired percentage of the total performance data being determined is actually received and processed by the data center. As a further alternative, the managers of a distributed application may selectively determine that only one or more specific performance metrics should be collected and received for processing at the data center, so that only those performance metrics that are of primary concern are processed. This filtering approach also will reduce the processing load of performance metric data by the data center.

Figure 2:
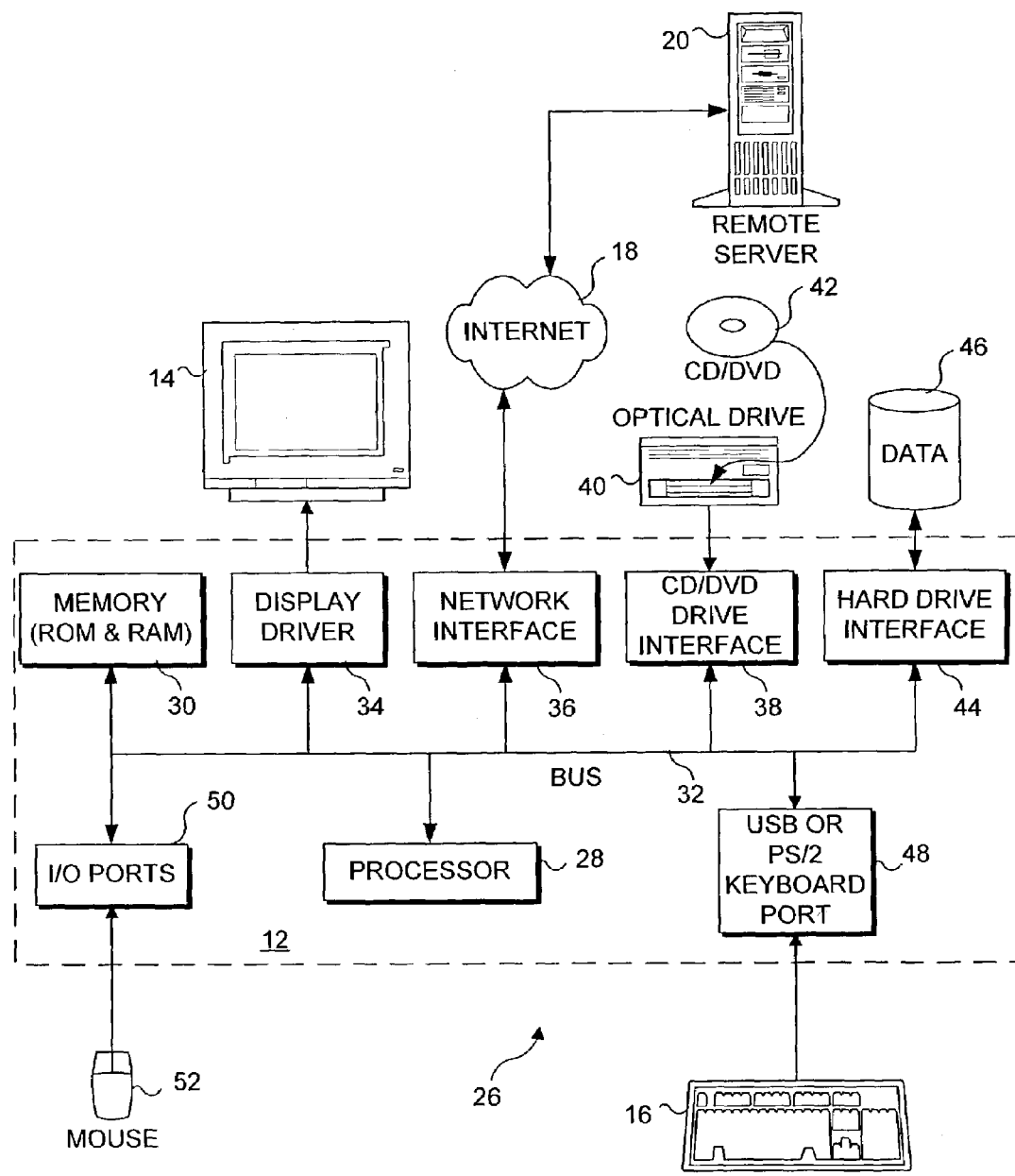
FIG. 2 is a schematic block diagram illustrating the components of a generally conventional personal computer suitable as either a recipient of monitored distribution application data (e.g., a monitored Web page) or as a source of the monitored application data, in connection with implementing the present invention.

FIG. 2 illustrates an exemplary computer 26 and some of the functional components that are included therein for use in implementing the present invention. This figure applies both to a computing device used for receiving a monitored HTML Web page or other type of distributed application data, and to a computing device that is the source of the Web page or distributed application data (e.g., server 20). It should also be noted that computer 24 at the data center includes components substantially identical to those that are included in computer 26, for carrying out the collection and processing functions.

Computer 26 comprises a processor chassis 12 in which a processor 28 is connected to a data bus 32. Also connected to data bus 32 is a memory 30, including both read only memory (ROM) and random access memory (RAM). Memory 30 temporarily stores machine instructions that, when executed by processor 28, cause it to carry out the performance monitoring functions described herein, and other functions. Once these machine instructions are received by the client computer, the machine instructions are typically stored along with other data on a hard drive 46, which is connected to data bus 32 through a hard drive interface 44 and are loaded into memory 30 from the hard drive. Similarly, machine instructions that define the server performance monitoring functions as described herein and other functions that it performs are also stored on its corresponding hard drive.

Also optionally connected to data bus 32 is a display driver 34 that provides a video signal used to drive monitor 14 on which text and images are rendered and displayed under the control of processor 28. In most cases, a monitored Web page is rendered and displayed on the monitor of a client computer to a user browsing the Web page, and the performance of the browser program in fetching the Web page and displaying the images referenced therein is one of the types of performance metrics that is determined. A network interface 36 is connected to bus 32 and provides access to the Internet (or another network) 18. The client computer employs the network interface to connect over the network to a corresponding network interface of server 20 on which Web pages and data files are stored for access by the browser program running on personal computer 26 or by other software requiring access of the files stored on or accessible through server 20. The network interface may comprise a conventional modem, an Integrated Services Digital Network (ISDN) interface, or a network interface card or other device that provides access to the Internet. For example, the personal computer may connect to the Internet through a digital subscriber line (DSL) interface or through a cable modem. A compact disc/digital video disc (CD/DVD) drive interface 38 provides access to data stored on a CD (or a DVD disk or other optical storage medium) 42, which is read by an optical drive 40 connected to the CD/DVD drive interface. Also coupled to data bus 32 are Input/Output (I/O) ports 50, one of which may be connected to a mouse 52 (or other pointing device), and a PS/2 keyboard port or a universal serial bus (USB) port 48, to which keyboard 16 is typically connected for input of text and commands by the user. It is also contemplated that if a computing device is employed that does not have a keyboard, an alternative input (or no input device) may be included. For example, a touch screen input device or voice recognition might be employed for input and control of the system. Similarly, instead of a monitor for display, data may be provided aurally.

If network access devices other than a personal computer are used, they will typically include at least a processor, a memory, non-volatile memory for storage of machine instructions and data, some form of input/output, and appropriate interfaces thereto, or alternatively, one or more integral circuits in which these functional components are implemented. In addition, most network interface devices will include a network interface, and/or a wireless network connection.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method of analyzing the performance of a distributed application across a network using measurement related to a plurality of different content sources, the method comprising the steps of:
    (a) obtaining performance data related to the distributed application, the performance data including measurements related to different content sources;
    (b) defining a metric for a specific type of network structure related to the distributed application, the metric quantifying a relative performance of the distributed application with respect to the specific type of network structure, said metric comprising a ratio of performance data, such that a numerator of the ratio comprises a measurement related to one of the different content sources, and a denominator of the ratio comprises a measurement related to another of the different content sources;
    (c) for different network structures of the same type as said specific type of network structure, using the defined metric and the performance data to obtain a numerical result corresponding to the relative performance of the distributed application; and
    (d) comparing the numerical result for each different network structure, to determine a relative performance of the distributed application with respect to the specific type of network structure.

2. The method of claim 1, further comprising the steps of:
    (a) obtaining additional performance data, the additional performance data including measurements related to different content sources;
    (b) for each different network structure of the specific type of network structure, using the defined metric and the additional performance data to obtain an additional numerical result corresponding to a relative performance of the distributed application with respect to the network structure; and
    (c) comparing the additional numerical result for each different network structure, to determine a relative performance of the distributed application with respect to the type of network structure.

3. The method of claim 1, further comprising the steps of:
    (a) obtaining additional performance data, the additional performance data including measurements related to different content sources;
    (b) for each different network structure of the specific type of network structure, using the defined metric and the additional performance data to obtain an additional numerical result corresponding to a relative performance of the distributed application with respect to the network structure; and
    (c) for each different network structure, determining an average value based on the numerical result and each additional numerical result corresponding to the specific type of network structure, to determine a relative performance of the distributed application with respect to the type of network structure.

4. The method of claim 1, wherein the step of obtaining performance data comprises the step of utilizing performance data previously obtained for a different purpose.

5. The method of claim 1, wherein the step of obtaining performance data comprises the step of collecting the performance data specifically to determine the relative performance of the distributed application.

6. The method of claim 1, further comprising the steps of:
(a) defining an additional metric for an additional specific type of network structure related to the distributed application, the additional metric quantifying a relative performance of the distributed application with respect to the additional specific type of network structure, each metric including measurements related to different content sources;
(b) for each different network structure of the additional specific type, using the additional metric that was defined and the performance data to obtain an additional numerical result corresponding to the relative performance of the distributed application with respect to the additional different network structure; and
(c) comparing the additional numerical results for each different network structure of the additional specific type, to determine the relative performance of the distributed application with respect to the additional specific type of network structure.

7. The method of claim 1, wherein the denominator further comprises an average of a selected measurement related to each different one of the different content sources.

8. The method of claim 1, wherein the denominator further comprises an average of a selected measurement related to each different one of the different content sources, but not related to the one of the different content sources whose selected measurement comprises the numerator of the ratio.

9. The method of claim 1, wherein a numerator of the ratio comprises a throughput of a first one of the different content sources, and the denominator comprises an average of the throughputs of each other one of the different content sources.

10. The method of claim 1, wherein a numerator of the ratio comprises a throughput of a first one of the different content sources, and the denominator comprises an average of the throughputs of each of the different content sources.

11. The method of claim 1, wherein a numerator of the ratio comprises a render time required to retrieve a component from a source on the network and a time required to process the component to display it, and wherein the denominator comprises a fetch time required to retrieve a base document relating to the distributed application from a source and process the base document.

12. The method of claim 1, wherein the network structure is for a Web page.

13. The method of claim 1, wherein the network structure is for a network subnet.

14. The method of claim 1, wherein the network structure is for an autonomous system.

15. The method of claim 1, wherein the network structure is for at least one of an economic entity, a political entity, and a geographic entity.

16. The method of claim 1, wherein a ratio of bandwidths is employed for analyzing Web pages.

17. The method of claim 1, wherein the distributed application comprises a Web site.

18. The method of claim 1, wherein the metric comprises a ratio of selected metrics of the distributed application.

19. The method of claim 18, wherein the ratio comprises a render time divided by a fetch time.

20. The method of claim 18, wherein the ratio comprises a render bandwidth divided by a fetch bandwidth.

21. The method of claim 18, wherein the ratio is for metrics related to obtaining data from different sources.

22. The method of claim 1, wherein the two content sources comprise different Internet Service Providers (ISPs), and wherein the metric comprises a ratio of metrics for retrieving a document relating to the distributed application using each different ISP.

23. The method of claim 22, wherein the ratio comprises a metric for retrieving a document relating to the distributed application using a first one of the different Internet Service Providers (ISPs), divided by metric for retrieving the document relating to the distributed application using a second one of the different ISPs.

24. An article of manufacture adapted for use with a processor, comprising:
(a) a memory medium; and
(b) a plurality of machine instructions, which are stored on the memory medium, said plurality of machine instructions when executed by a processor, causing the processor to:
(i) access performance data related to the distributed application, the performance data including measurements related to different content sources;
(ii) enable a user to define a metric for a specific type of network structure related to the distributed application, the metric quantifying a relative performance of the distributed application with respect to the specific type of network structure, said metric comprising a ratio of performance data, such that a numerator of the ratio comprises a measurement related to one of the different content sources, and a denominator of the ratio comprises a measurement related to another of the different content sources; and
(iii) compute a numerical result for each network structure of the specific type of network structure using the defined metric and the performance data, the numerical result corresponding to a relative performance of the distributed application with respect to the network structure.

25. An article of manufacture adapted for use with a processor, comprising:
(a) a memory medium; and
(b) a plurality of machine instructions, which are stored on the memory medium, said plurality of machine instructions when executed by a processor, causing the processor to:
(i) enable a user to select a specific type of network structure related to the distributed application;
(ii) based on the specific type of network structure selected by the user, access performance data related to the distributed application and the specific type of network structure that was selected, the performance data including measurements related to different content sources;
(iii) based on the specific type of network structure selected by the user, access a predefined metric that quantifies a relative performance of the distributed application with respect to the specific type of network structure that was selected, said predefined metric comprising a ratio of performance data, such that a numerator of the ratio comprises a measurement related to one of the different content sources, and a denominator of the ratio comprises a measurement related to another of the different content sources; and
(iv) compute a numerical result related to the distributed application for each network structure of the type selected, using the predefined metric and the performance data, the numerical result corresponding to a relative performance of the distributed application with respect to the network structure.

26. A system for measuring a performance of a distributed application across a network, comprising:
(a) a memory in which a plurality of machine instructions are stored;
(b) a display; and
(c) a processor that is coupled to the memory to access the machine instructions and to the display, said processor executing said machine instructions and thereby implementing a plurality of functions, as follows:
  (i) accessing performance data related to the distributed application, the performance data including measurements related to different content sources;
  (ii) enabling a user to define a metric for a specific type of network structure related to the distributed application, the metric quantifying a relative performance of the distributed application with respect to the specific type of network structure, said predefined metric comprising a ratio of performance data, such that a numerator of the ratio comprises a measurement related to one of the different content sources, and a denominator of the ratio comprises a measurement related to another of the different content sources; and
  (iii) computing a numerical result for each network structure of the specific type using the defined metric and the performance data, the numerical result corresponding to a relative performance of the distributed application with respect to the network structure.

27. A system for measuring the performance of a distributed application across a network, comprising:
(a) a memory in which a plurality of machine instructions are stored;
(b) a display; and
(c) a processor that is coupled to the display and to the memory to access the machine instructions, said processor executing said machine instructions and thereby implementing a plurality of functions, including:
  (i) enabling a user to select a specific type of network structure related to the distributed application;
  (ii) based on the specific type of network structure selected by the user, accessing performance data related to the distributed application and the specific type of network structure selected, the performance data including measurements related to different content sources;
  (iii) based on the specific type of network structure selected by the user, accessing a predefined metric that quantifies a relative performance of the distributed application with respect to network structures of the specific type, said predefined metric comprising a ratio of performance data, such that a numerator of the ratio comprises a measurement related to one of the different content sources, and a denominator of the ratio comprises a measurement related to another of the different content sources; and
  (iv) computing a numerical result for each network structure of the selected specific type related to the distributed application using the predefined metric and the performance data, the numerical result corresponding to a relative performance of the distributed application with respect to that network structure.

28. A method of analyzing the performance of a distributed application across a network, comprising the steps of:
(a) identifying a plurality of similar network structures related to the distributed application that can be compared to one another to determine a relative performance of the distributed application;
(b) for each similar network structure identified, obtaining data related to the performance of the distributed application, said data comprising measurements relating to different content sources;
(c) defining performance metrics for the plurality of similar network structures using the data, said metrics comprising a ratio of performance data, such that a numerator of the ratio comprises a measurement related to one of the different content sources, and a denominator of the ratio comprises a measurement related to another of the different content sources;
(d) computing the performance metric for each similar network structure identified, to obtain a numerical result; and
(e) comparing numerical results computed for the plurality of similar network structures, to determine a relative performance of the distributed application with respect to the plurality of similar network structures identified.

29. A method of analyzing the performance of a distributed application across a network, comprising the steps of:
(a) providing a set of performance records relating to the distributed application, each performance record comprising measurements for different content sources;
(b) for each content source, computing a metric, said metric comprising a ratio of performance data, such that a numerator of the ratio comprises a measurement related to one of the different content sources, and a denominator of the ratio comprises a measurement related to another of the different content sources; and
(c) analyzing metrics for the set of performance records according to a network structure, to determine a relative performance of the different content sources by quantifying the performance of the distributed application for a first one of the different content sources, relative to a standard defined by a second one of the different content sources.

30. The method of claim 29, wherein the step of analyzing the metrics for the set of performance records comprises the steps of:
(a) computing a baseline metric, wherein said baseline metric is the mean of the metrics for the set of performance records;
(b) classifying the metrics for the set of performance records according to the network structure, such that metrics corresponding to related network structures are classified together in a common class;
(c) for each class of metrics corresponding to related network structures, determining an average metric for the class; and
(d) comparing the average metric for each class to the baseline metric.

31. The method of claim 29, wherein the step of providing a set of performance records comprises the step of utilizing a set of performance records that were previously provided for a different purpose.

32. The method of claim 29, wherein the step of providing a set of performance records comprises the step of generating a set of performance records specifically for measuring the performance of the distributed application across a network.

33. The method of claim 29, wherein the performance records comprise:
(a) a fetch time required to retrieve a base document relating to the distributed application from a remote location in the network, to a specific end point; and (b) a render time required to retrieve and display an object relating to the distributed application.

34. The method of claim 29, wherein the network structure is for a Web page.

35. The method of claim 29, wherein the network structure is for a network subnet.

36. The method of claim 29, wherein the network structure is for an autonomous system.

37. The method of claim 29, wherein the network structure is for at least one of an economic entity, a political entity, and a geographic entity.

38. The method of claim 29, wherein a ratio of bandwidths is employed for analyzing Web pages.

39. The method of claim 29, wherein the distributed application comprises a Web site.

40. The method of claim 29, wherein the ratio comprises a render time divided by a fetch time.

41. The method of claim 40, wherein the set of performance records comprises performance records corresponding to different subnets.

42. The method of claim 29, wherein the ratio comprises a render bandwidth divided by a fetch bandwidth.

43. The method of claim 42, wherein the set of performance records includes performance records for different Web pages.

44. The method of claim 29, wherein the different content sources are associated with different Internet Service Providers (ISPs), and the metric comprises a ratio based on measurements relating to the distributed application for each different ISP.

45. An article of manufacture adapted for use with a processor, comprising:
   (a) a memory medium; and
   (b) a plurality of machine instructions, which are stored on the memory medium, said plurality of machine instructions when executed by a processor, cawing to processor to:
      (i) access a set of performance records relating to the distributed application, each performance record comprising measurements for different content sources;
      (ii) for each performance record, compute a metric that reveals a relative performance of the different content sources, said metric comprising a ratio of performance data, such that a numerator of the ratio comprises a measurement related to one of the different content sources, and a denominator of the ratio comprises a measurement related to another of the different content sources;
      (iii) compute a baseline metric, wherein said baseline metric is a mean of the metrics for the set of performance records, said metrics each comprising a ratio of performance data, such that a numerator of the ratio comprises a measurement related to one of the different content sources, and a denominator of the ratio comprises a measurement related to another of the different content sources;
      (iv) classify the metrics for the set of performance records according to the network structure, so that metrics corresponding to related network structures are classified together in common classes;
      (v) for each of the common classes corresponding to related network structures, determine an average metric; and
      (vi) compare the average metric to the baseline metric.

46. A system for measuring a performance of a distributed application across a network, comprising:
   (a) a memory in which a plurality of machine instructions defining the parent application are stored;
   (b) a display; and
   (c) a processor that is coupled to the display and to the memory to access the machine instructions, said processor executing said machine instructions and thereby implementing a plurality of functions, including:
      (i) enabling a user to access a set of performance records relating to the distributed application, each performance record comprising measurements from different content sources;
      (ii) for each performance record, computing a metric that reveals a relative performance of the different content sources, said metric comprising a ratio of performance data, such that a numerator of the ratio comprises a measurement related to one of the different content sources, and a denominator of the ratio comprises a measurement related to another of the different content sources; and
      (iii) analyzing metrics for the set of performance records according to a network structure, to determine a relative performance of the different content sources by quantifying the performance of the distributed application with respect to a first one of the different content sources relative to a standard defined by a second one of the different content sources.

47. The system of claim 46, wherein the plurality of functions implemented by the processor executing said machine instructions further include:
   (a) computing a baseline metric, wherein said baseline metric is a mean of metrics for the set of performance records;
   (b) classifying the metrics for the set of performance records according to the network structure, such that metrics corresponding to related network structures are classified together in common classes of metrics;
   (c) for each class of metrics corresponding to related network structures, determining an average metric for the class; and
   (d) comparing the average metric for each class to the baseline metric.

48. A method for measuring a performance of a distributed application across a network, comprising the steps of:
   (a) providing a set of performance records relating to the distributed application, each performance record comprising measurements from different content sources;
   (b) for each performance record, computing a metric that reveals a relative performance of the different content sources;
   (c) computing a baseline metric, wherein said baseline metric is a mean of metrics for the set of performance records, said metrics comprising a ratio of performance data, such that a numerator of the ratio comprises a measurement related to one of the different content sources, and a denominator of the ratio comprises a measurement related to another of the different content sources;
   (d) classifying the metrics for the set of performance records according to a structure of the network, such that metrics corresponding to related network structures are classified together in common classes of metrics;
   (e) for each class of metrics corresponding to related network structures, determining an average metric for the class; and
   (f) comparing the average metric for each class to the baseline metric to determine a relative performance of the distributed application.

49. The method of claim 48, wherein the ratio comprises at least one of time divided by another time, a bandwidth divided by another bandwidth, a throughput of said at least one of the different content sources divided by an average of throughputs of all other of the different content sources, and a throughput of said at least one of the different content sources divided by an average of throughputs of each of the different content sources.

* * * * *